United States Patent [19]

Brockman et al.

[11] Patent Number: 5,261,695
[45] Date of Patent: Nov. 16, 1993

[54] AIR BAG DEVICE FOR VEHICLES

[75] Inventors: Stephen J. Brockman; Larry D. Hoagland; Michael F. Fink, all of Hamilton County, Ind.

[73] Assignee: Ideatech, Inc., Fishers, Ind.

[21] Appl. No.: 940,981

[22] Filed: Sep. 4, 1992

[51] Int. Cl.⁵ .............................................. B60R 21/26
[52] U.S. Cl. ...................................... 280/737; 222/5
[58] Field of Search ............. 280/737, 728, 734, 736, 280/741, 742; 222/5

[56] References Cited

U.S. PATENT DOCUMENTS

| 3,731,948 | 5/1973 | Risko ................................. 280/737 |
| 3,834,729 | 9/1974 | Oka et al. ........................... 280/737 |
| 5,022,674 | 6/1991 | Frantom et al. ................. 280/737 X |
| 5,076,607 | 12/1991 | Woods et al. ..................... 280/737 |

Primary Examiner—Joseph D. Pape
Attorney, Agent, or Firm—Jack Schuman

[57] ABSTRACT

Air bag device, for use on a vehicle having collision sensing means, comprises a reservoir of pressurized fluid sealed by a frangible plate and an inflatable cushion connected to the reservoir. A striking member, having a piston at one end and a conical point at the other end, is slidably mounted in a cylinder in the reservoir. Lead styphnate and a length of electrically heated nichrome wire are positioned in the cylinder adjacent the piston. If a collision occurs, the collision sensing means sends an electrical signal, through wiring passing through a hermetic seal in the reservoir, to the length of nichrome wire which ignites the lead styphnate, generating combustion gases which bear against the piston thereby rapidly driving the conical point of the striking member into the frangible plate to shatter it, releasing pressurized fluid from the reservoir into the cushion to inflate it.

15 Claims, 6 Drawing Sheets

AIR BAG DEVICE FOR VEHICLES

BACKGROUND OF THE INVENTION (1) Field of the Invention

This invention relates, broadly speaking, to a safety device for vehicles.

More particularly, this invention relates to an improved air bag device for a vehicle, which device can rapidly be deployed by inflation in the event of a collision to prevent or reduce the extent of injury to an occupant of the vehicle.

(2) Description of the Prior Art

Air bag devices for vehicles are known. Such air bag devices have in the past been based upon the ignition of a quantity of rapidly combustible material, particularly sodium azide, triggered by a collision sensor on the vehicle, to rapidly generate combustion gases in sufficient quantity to inflate the air bag which then acts as a cushion to protect the occupant of the vehicle from injury which otherwise could result from the occupant coming into violent contact with the steering wheel or dashboard of the vehicle. Although these prior art air bag devices have been instrumental in reducing the number of fatalities or serious injuries, they have a number of shortcomings, among which are the generation of high temperature combustion gases of approximately 300° F. which when vented have caused serious burns on the body of the occupant, and the problem of disposing of the environment-unfriendly combustible sodium azide in the event, more probable than not, that the vehicle is brought to an automobile junkyard without the air bag device having been deployed as the result of a collision. So dangerous is the sodium azide that government regulations require that it be ignited before automobile junkyards can accept or retain the vehicle.

A notable improvement in air bag devices is described in copending U.S. patent application Ser. No. 07/741,304 filed on Aug. 7, 1991 in the names of Larry D. Hoagland and Stephen J. Brockman, now U.S. Pat. No. 5,152,550, entitled "Air Bag Device for Vehicles," and assigned to the assignee of the present application. Such improvement in air bag devices, as disclosed in the said copending patent application, employs, among other things:

(a) a reservoir containing prior to collision a pressurized fluid and having an outlet, (b) an inflatable cushion having an inlet and being inflated solely by the pressurized fluid in the reservoir in the event of a collision, (c) a frangible plate interposed between the outlet of the reservoir and the inlet of the inflatable cushion and preventing the passage of pressurized fluid from the reservoir to the interior of the inflatable cushion, the frangible plate having an upstream side facing the outlet of the reservoir and a downstream side, the frangible plate being brittle and shattering into discrete fragments when struck, (d) a striking member adjacent the downstream side of the frangible plate and having a first end to strike the downstream side of the frangible plate to rapidly shatter the frangible plate, and a second end opposite the first end, and (e) means to rapidly apply a force to the second end of the striking member in response to a signal of a collision, to drive the striking member toward the downstream side of the frangible plate so that the first end of the striking member shatters the frangible plate, (f) whereupon pressurized fluid escapes from the reservoir and inflates the cushion.

SUMMARY OF THE INVENTION

One of the objects of this invention is to provide a novel air bag device using pressurized fluid to inflate the air bag, which device permits substantial flexibility in size and profile to meet placement constraints in a vehicle.

Other and further advantages of this invention will become apparent by reference to the accompanying specification, the drawings and the appended claims.

Briefly, the foregoing advantages are attained by providing a vehicle with a reservoir containing pressurized fluid, a frangible plate interposed between the outlet of the reservoir and the inlet of an inflatable cushion, and a striking member placed within the reservoir adjacent the upstream or high pressure side of the frangible plate, the striking member being rapidly advanced in the event of a collision involving the vehicle to rapidly shatter the frangible plate, whereupon pressurized fluid escapes from the reservoir into the cushion to inflate the cushion.

DESCRIPTION OF THE DRAWINGS

Referring now to the drawings, in which like numerals represent like parts in the several views.

DESCRIPTION OF THE PREFERRED EMBODIMENTS

In the embodiment of FIGS. 1–5, the air bag device is seen as comprising reservoir 1, inflatable air bag or cushion 2, and frangible plate 3 interposed between reservoir 1 and air bag 2.

Figures 1, 2:
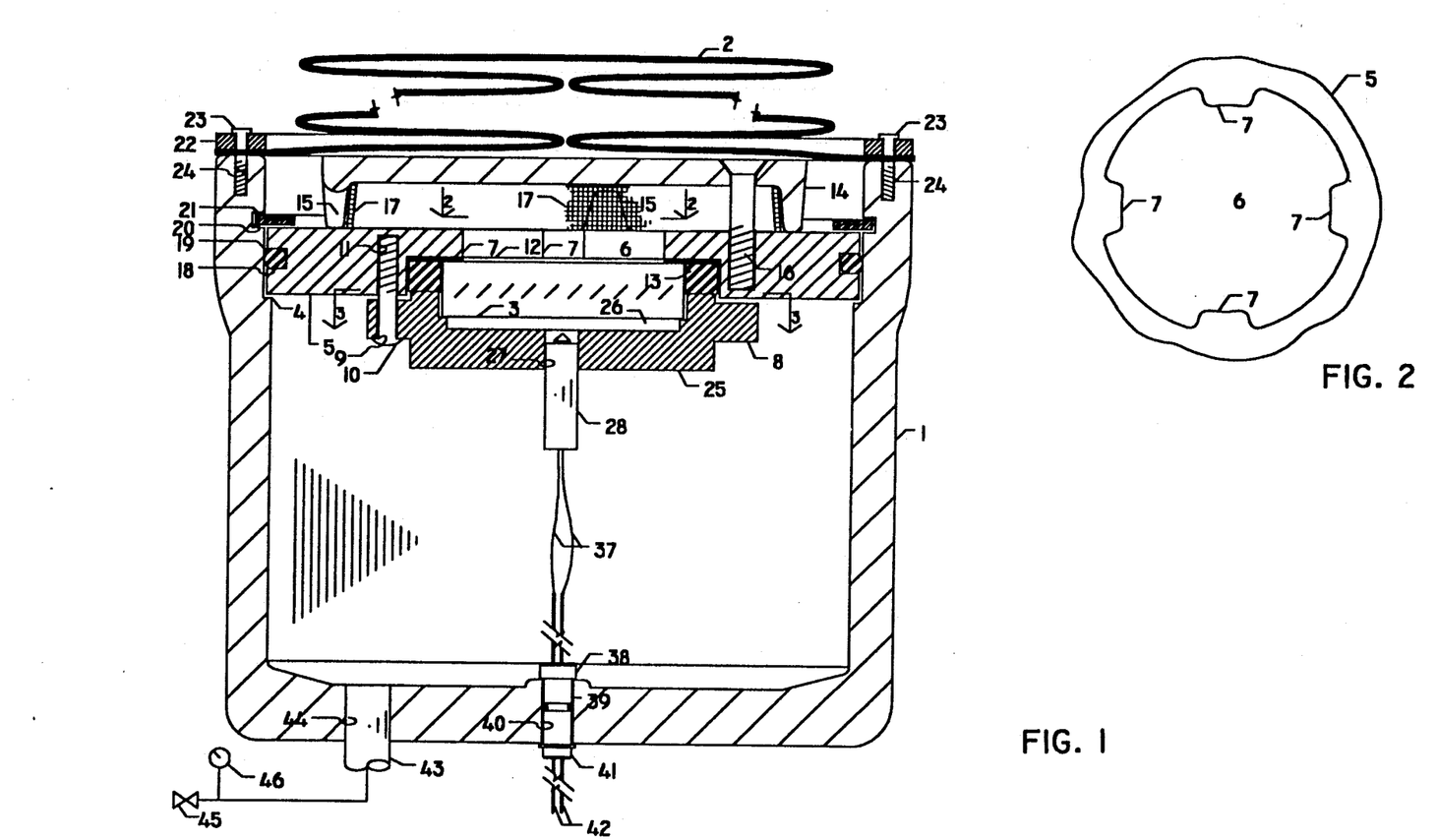
FIG. 1 represents a medial longitudinal partial section of one embodiment of the present invention, showing diagrammatically the air bag in collapsed (i.e., non-inflated) condition prior to a collision involving the vehicle in which this embodiment of the present invention is mounted.
FIG. 2 represents a partial view in plan of the closure plate as seen from line 2—2 of FIG. 1.

The inner diameter of reservoir 1 is stepped or reduced as shown so as to provide an inwardly projecting ledge 4 extending completely around the inside of reservoir 1 to support the bottom surface of closure plate 5 during assembly of the air bag device and prior to introducing pressurized fluid therein.

Closure plate 5 is provided with central aperture 6 and radially spaced lips 7 extending partially into central aperture 6.

Frangible plate 3 is made of brittle material such as glass and preferably tempered glass, Ceramic, porcelain, brittle alloys or mixtures or composites, brittle sintered members, brittle plastics or polymers, or other brittle material, and is characterized by its tendency to undergo extremely rapid multi-directional crack propagation when struck with sufficient force and thus to rapidly shatter into numerous discrete fragments. In other words, frangible plate 3 virtually instantaneously disintegrates when struck a shattering blow. Plates or discs similar in function to frangible plate 3 are well known in the art of containing pressurized fluids, and are sometimes referred to as "bursting discs." Frangible plate 3 has sufficient strength to withstand the pressure exerted on its bottom or high-pressure face by pressurized fluid in reservoir 1, and does not require any support against such pressure other than the peripheral support of lips 7 on closure plate 5, thus leaving the major central area of frangible plate 3 totally unobstructed.

Figure 3:
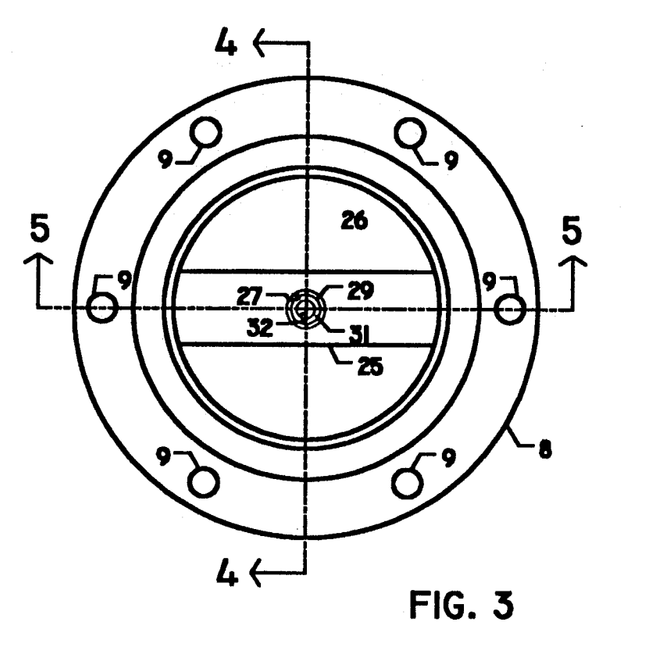
FIG. 3 represents a view in plan of the seal compressor employed in the embodiment of FIG. 1, as seen from line 3—3 of FIG. 1.

Seal compressor 8 is provided with radially spaced apertures 9 receiving bolts 10 threaded into threaded apertures 11 in closure plate 5.

A cushion gasket 12 is positioned in central aperture 6 around the upper periphery of frangible plate 3, and an elastomeric peripheral damper mount 13 is positioned around the circumference of frangible plate 3.

Frangible plate 3 is supported just below central aperture 6 by means of seal compressor 8 bearing against the bottom periphery of frangible plate 3, and forcing the upper periphery of frangible plate 3 against cushion gasket 12 which bears against the bottom surfaces of lips 7. By means of bolts 10 threaded into apertures 11 and sufficiently tightened so as to compress damper mount 13 and cushion gasket 12, brittle frangible plate 3 is in effect held in elastomeric material and thereby is protected against unintended forces such as mechanical vibrations which otherwise might shatter it and prematurely release pressurized fluid from reservoir 1.

Filter housing 14, provided with radially spaced apertures 15 (only two of which are shown), is bolted to the upper surface of closure plate 5, coaxially with central aperture 6 as shown, by means of radially spaced bolts 16 (only one of which is shown). Filter 17 is positioned within filter housing 14, extending around the inner periphery thereof and thus being interposed between all apertures 15 and the interior of filter housing 14. Filter 17 is preferably a screen mesh of suitable material, and is provided to prevent the numerous discrete fragments resulting from the shattering of frangible plate 3 from entering air bag 2.

Recess 18 extends completely around the circumference of closure plate 5 and receives O-ring seal 19 which bears against the inside of reservoir 1.

Recess 20 extends completely around the inside of reservoir 1 and receives split retaining ring 21 which holds closure plate 5 in position in reservoir 1 against ledge 4.

Retaining ring 22 extends completely around the peripheral edge of air bag 2 as shown, and is pressed against the said peripheral edge to force the peripheral edge into fluid-tight contact with the top of reservoir 1 by means of radially spaced bolts 23 (only two of which are shown) passing through the retaining ring 22 and peripheral edge of the air bag 2 and tightly threaded into threaded apertures 24 in reservoir 1. Other means for fluid-tightly coupling the air bag 2 to reservoir 1 to prevent leakage of pressurized fluid therebetween will be apparent to those familiar with this art.

Figure 4:
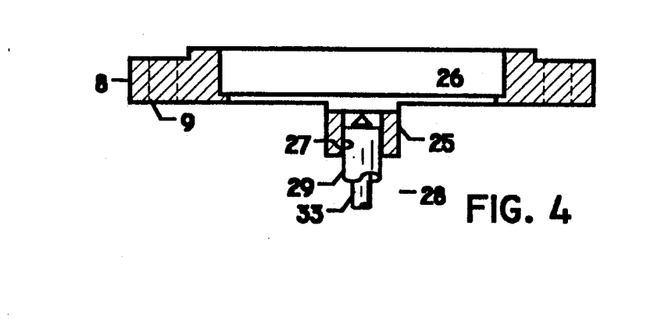
FIG. 4 represents a section in elevation of the seal compressor of FIG. 3, taken along the line 4—4 of FIG. 3, and showing the upper end of the actuator cylinder and the upper end of the striking member prior to collision.
Figure 5:
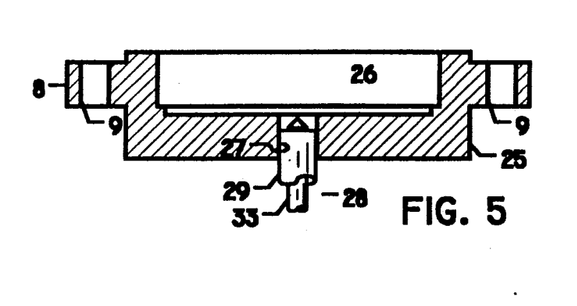
FIG. 5 represents a section in elevation of the seal compressor of FIG. 3, taken along the line 5—5 of FIG. 3, and showing the upper end of the actuator cylinder and the upper end of the striking member prior to collision.

Seal compressor 8 is formed with bridge 25 vertically offset from and thus spanning aperture 26 in the seal compressor 8 in a different horizontal plane as shown. The width of bridge 25 is just sufficient to have formed therethrough aperture 27 which receives actuator 28, but is not so wide as to significantly vertically obstruct aperture 26 in seal compressor 8. It will be apparent from the drawings that the vertically unobstructed portion of aperture 26 in seal compressor 8 is, from the fluid-flow functional standpoint, virtually the same as the major central area of frangible plate 3.

Figure 6:
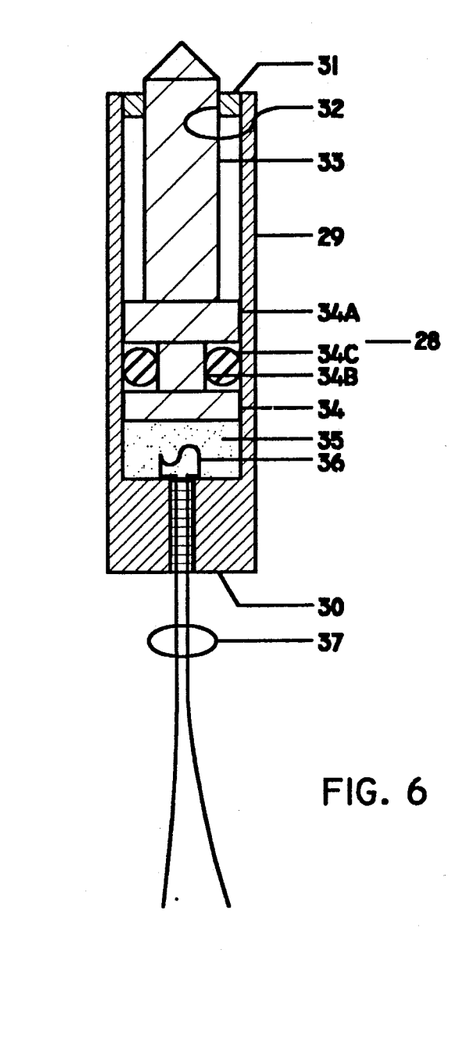
FIG. 6 represents an enlarged medial longitudinal section of the actuator, showing the striking member slidably mounted therein prior to collision.
Figure 7:
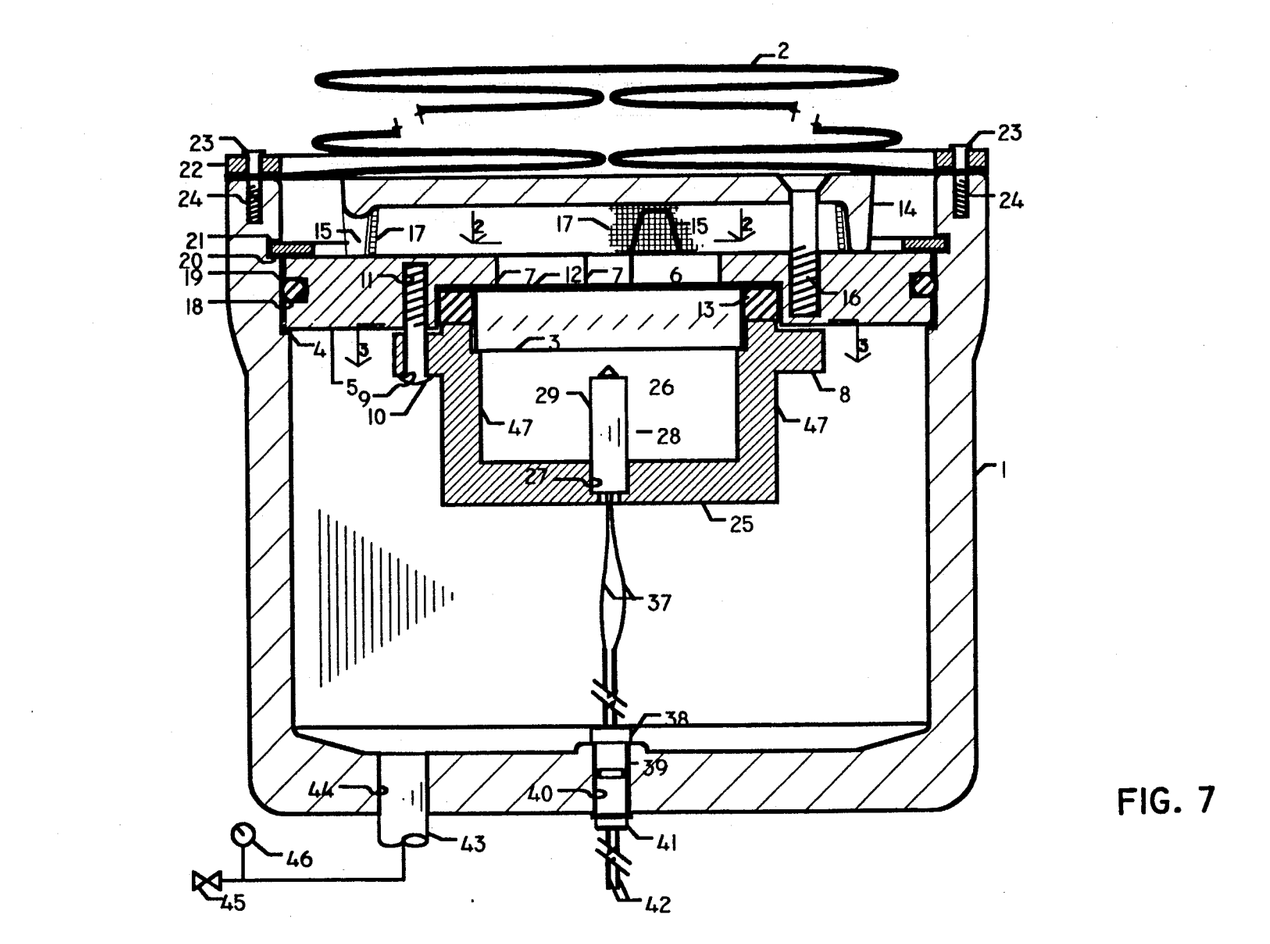
FIG. 7 represents a medial longitudinal partial section of another embodiment of the present invention, showing diagrammatically the air bag in collapsed (i.e., non-inflated) condition prior to a collision involving the vehicle in which this embodiment of the present invention is mounted.
Figure 8:
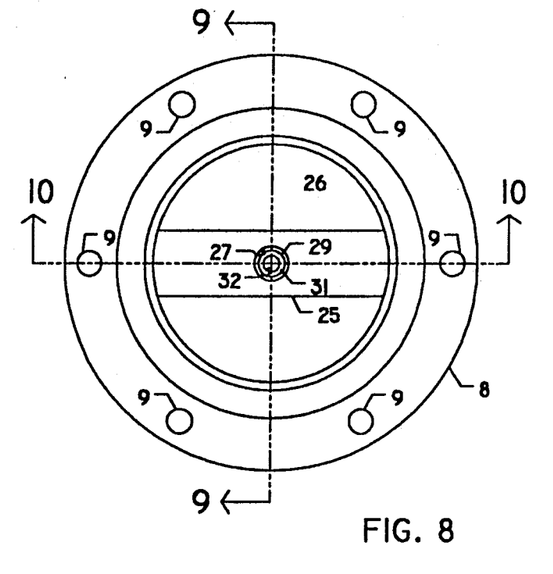
FIG. 8 represents a view in plan of the seal compressor employed in the embodiment of FIG. 7, as seen from line 8—8 of FIG. 7.
Figure 9:
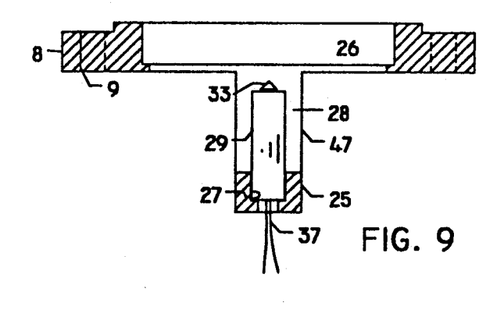
FIG. 9 represents a section in elevation of the seal compressor of FIG. 8, taken along the line 9—9 of FIG. 8, and showing the upper end of the actuator cylinder and the upper end of the striking member prior to collision.
Figure 10:
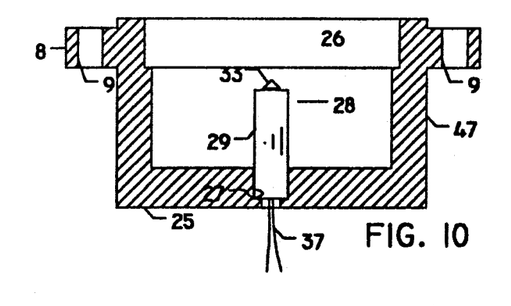
FIG. 10 represents a section in elevation of the seal compressor of FIG. 8, taken along the line 10—10 of FIG. 8.

As shown in detail in FIG. 6, actuator 28 consists of cylinder 29 of sufficient thickness and strength as to resist internal collapse or distortion due to the pressure of pressurized fluid in reservoir 1. The bottom end of cylinder 29, which is that end remote from frangible plate 3, is sealed shut by closure means, for example by plate 30 which may be formed integrally with cylinder 29 or which may be a separate piece suitably secured to the bottom end of cylinder 29. The upper end of cylinder 29, which is that end proximate to frangible plate 3, is secured in central aperture 27 of bridge 25 by suitable means known to those familiar with this art, such as threading or cementing. Aperture 27 thus functions as a receptacle for cylinder 29. Guide means, preferably plate 31 having a central orifice 32 extending therethrough, is secured, by suitable means such as threading, cementing, soldering, or brazing, in the upper end of cylinder 29. Alternatively, bridge 25 may be formed with an integral orifice 32 functioning as a guide means, above aperture 27. In any event, orifice 32 is coaxial with the longitudinal axis of cylinder 29. Striking member 33 in cylinder 29 has a diameter slidably fitting within orifice 32. The front or upper end of striking member 33, that end used to shatter frangible plate 3, is conically shaped to bring it to a point. Preferably, the conical tip of striking member 33 is made of hardened steel having a Rockwell C hardness of 50–52. The rear or bottom end of striking member 33 is provided with piston 34 slidably engaging the inner periphery of cylinder 29. Piston 34 may be formed integrally with striking member 33, or may be secured to striking member 33 in a manner known to those familiar with this art. Vertically spaced from piston 34, along the longitudinal axis of striking member 33, is a second piston 34a formed integrally with or otherwise suitably secured to striking member 33. The diameter of striking member 33 is reduced at 34b, and an O-ring seal 34c is maintained in position around section 34b of striking member 33, between pistons 34 and 34a.

It will be seen that, in the event of a collision, striking member 33 is guided along its longitudinal axis in travelling to shattering engagement with frangible plate 3 by means of piston 34 sliding in cylinder 29 and striking member 33 sliding in orifice 32. It will be apparent that the conical end of striking member 33, prior to actuation, is positioned in close proximity to, but not in contact with, the high pressure face of frangible plate 3, and that the length of guided engagement of striking member 33 in cylinder 29 is greater than the distance striking member 33 must travel to shatter frangible plate 3 in the event of a collision.

Between the piston 34 and plate 30 is placed a small portion of explosive 35, preferably lead styphnate and typically no more than 10 milligrams (compared to the 100-200 grams of sodium azide conventionally employed to inflate air bags.) Electrical ignition means 36, preferably a length of nichrome wire, is positioned between piston 34 and plate 30 and is covered by the explosive 35. Electrical leads 37, connected at one end thereof to the ends of the ignition means 36, pass through a hermetically sealed aperture in plate 30 and are connected at the other end thereof to one end 38 of pass-through connector 39 extending through hermetically sealed aperture 40 in reservoir 1. The hermetic seal in aperture 40 around pass-through connector 39 prevents the escape of pressurized fluid from reservoir 1 to the atmosphere. The other end 41 of the pass-through connector 39 completes the connection through aperture 40 in reservoir 1. Electrical leads 42 are connected at one end thereof to end 41 of pass-through connector 39 and are connected at the other end thereof to one or more collision-sensing means (not shown) on the vehicle in which the air bag device is mounted. Such collision-sensing means are well-known, and may, for example, be electrical contact switches or motion detectors such as inertial switches and accelerometers. These collision-sensing means close an electrical circuit upon the occurrence of a collision involving the vehicle, and thus send an electrical signal to the air bag device. This electrical signal, passing through electrical leads 42, pass-through connector 39, electrical leads 37, and the electrical ignition means 36, will ignite the lead styphnate 35, rapidly generating combustion gases which act against piston 34 thus driving the striking member 33 along its longitudinal axis into frangible plate 3 so as to rapidly shatter the same and virtually instantaneously permit the passage of pressurized fluid from reservoir 1 through aperture 6 in closure plate 5.

The major central area of frangible plate 3 which is shattered and disintegrated when struck by striking member 33, the area of aperture 6 in closure plate 5, and the combined areas of apertures 15 in filter housing 14 each must be sufficiently large to permit the rapid passage of pressurized fluid from reservoir 1 into air bag 2.

The shattering effect of striking member 33 on frangible plate 3 permits the virtually instantaneous escape of pressurized fluid from reservoir 1, thence through aperture 26 of seal compressor 8, thence through central aperture 6 in closure plate 5, thence through filter 17, thence through apertures 15 in filter housing 14, and finally into air bag 2 to deploy the air bag 2 by inflating it.

It will be apparent that electrical leads 37 must be connected, through pass-through connector 39, to electrical leads 42 before closure plate 5 and attached structure are secured in position at the upper end of reservoir 1. For this reason, it may be desirable to employ electrical leads 37 of sufficient length to provide adequate slack. It may also be desirable to interpose in electrical leads 37, between actuator 28 and pass-through connector 39, a pair of mating male/female electrical connectors or plugs (not shown) of known design.

Reservoir 1 is filled with pressurized fluid through conduit 43 tightly threaded at one end into threaded aperture 44 extending through the wall of reservoir 1. The other end of conduit 43 is adapted to be connected to a source of pressurized fluid, and is provided with shut-off valve 45 to permit the conduit 43 to be disconnected from the source of pressurized fluid while retaining pressure within reservoir 1. A pressure gauge 46 may be provided in conduit 43 to permit verification of the amount of pressure within reservoir 1.

The manner of operation of the air bag device shown in FIGS. 1-5 will be apparent from the foregoing description.

In the embodiment of FIGS. 7-10, which is generally similar to the embodiment of FIG. 1-5, seal compressor 8 is modified to include legs 47 formed therewith and extending downwardly. The bottom of legs 47 are connected to the opposite ends of bridge 25, thereby maintaining bridge 45 in a plane sufficiently below seal compressor 8 as to permit the bottom end of cylinder 29 of actuator 28, sealed shut by plate 30 secured thereto, to be secured in aperture 27 of bridge 25, aperture 27 functioning as a receptacle for cylinder 29, and to permit the conical end of striking member 33 to be positioned relative to the high-pressure face of frangible plate 3 the same distance as in the embodiment of FIGS. 1-5. The manner of securement of the bottom end of cylinder 29 in aperture 27 will be the same as previously described for securing the upper end of cylinder 29 into the said aperture 27 for the embodiment of FIGS. 1-5. In assembling actuator 28, plate 31 with orifice 32 therethrough coaxially positioned relative to the longitudinal axis of cylinder 29 and slidably receiving striking member 33, will be secured in the upper end of cylinder 29 in a suitable manner as by threading or cementing. As with the embodiment of FIGS. 1-5, electrical leads 37 pass through a hermetically sealed aperture in plate 30.

The assembly and operation of the embodiment of FIGS. 7-10 is similar to the assembly and operation of the embodiment of FIGS. 1-5.

Figure 11:
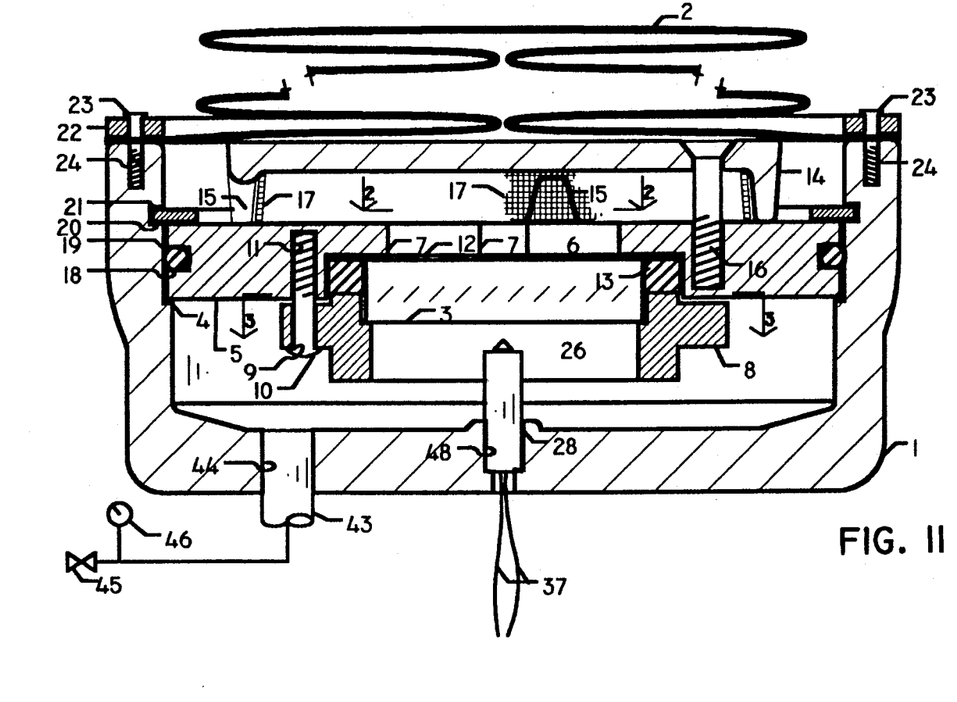
FIG. 11 represents a medial longitudinal partial section of yet another embodiment of the present invention, showing diagrammatically the air bag in collapsed (i.e., non-inflated) condition prior to a collision involving the vehicle in which this embodiment of the present invention is mounted.

In the embodiment of FIG. 11, seal compressor 8 does not have the bridge 25 of the previously described embodiments. Instead, actuator 28 is supported from the bottom of reservoir 1. Plate 31, with orifice 32 slidably receiving striking member 33, is secured by suitable means in the upper end of cylinder 29. Cylinder 29 is closed at its bottom by plate 30.

Cylinder 29 of actuator 28 is secured by suitable means, such as threading or cementing, into aperture 48 of reservoir 1 in such manner as to provide a hermetic seal around the cylinder 29 thereby to prevent the escape of pressurized fluid from the reservoir 1 through the said aperture 48. Aperture 48 functions as a receptacle for cylinder 29. Because of this hermetic seal, no pass-through connector 39 is required as in the previously described embodiments. Electrical leads 37, which are connected at one end to the electrical ignition means 36 (the length of nichrome wire) in the cylinder 29, pass through a hermetically sealed aperture in plate 30 and are connected at the other end directly to the collision-sensing means.

The distance between the conical end of striking member 33 and the high-pressure face of frangible plate 3 is the same as in the previously disclosed embodiments. This arrangement permits a very shallow reservoir 1 to be employed, which may be useful in meeting certain physical constraints on placement in the vehicle.

The assembly and operation of the embodiment of FIG. 11 is similar to the assembly and operation of the previously disclosed embodiments.

The foregoing specification is illustrative of the principles of the invention. Since modifications and changes which do not depart from the spirit of the invention may readily occur to those skilled in the art to which this invention pertains, this invention should not be considered as limited to the exact apparatus shown and described herein, and the appended claims should be construed as covering suitable modifications and requirements.

We claim:

1. For use in a vehicle having collision sensing means mounted thereon to rapidly generate a signal in response to a collision, cushioning apparatus to be mounted in said vehicle and deployed upon collision to protect an occupant in the vehicle from injury, said cushioning apparatus comprising:
   (a) a reservoir containing prior to collision a pressurized fluid and having an outlet,
   (b) an inflatable cushion having an inlet,
   (c) a frangible plate interposed between the outlet of said reservoir and the inlet of said inflatable cushion and preventing the passage of pressurized fluid from said reservoir to said inflatable cushion, said frangible plate having an upstream side facing the outlet of said reservoir and a downstream side opposite said upstream side, said frangible plate rapidly shattering into discrete fragments when struck,
   (d) first means to support said frangible plate around the periphery thereof so as to leave the major central area of said frangible plate unobstructed,
   (e) a striking member having a longitudinal axis, a first end to strike said frangible plate and rapidly shatter said frangible plate, a second end opposite said first end, and a transverse cross-section substantially smaller than the major central area of said frangible plate,
   (f) second means mounting said striking member within said reservoir adjacent the upstream side of said frangible plate for movement along said longitudinal axis toward the upstream side of said frangible plate,
   (g) third means within said reservoir to rapidly apply a force to the second end of said striking member in response to a signal generated by said collision sensing means to drive said striking member along said longitudinal axis toward the upstream side of said frangible plate so that the first end of said striking member shatters said frangible plate,
   (h) an aperture in said reservoir,
   (i) fourth means connected to said third means and extending through said aperture, said fourth means to be connected to said collision sensing means so that a signal generated by said collision sensing means is communicated through said fourth means to said third means,
   (j) fifth means hermetically sealing said aperture about said fourth means to prevent the escape of pressurized fluid from said reservoir through said aperture,
   (k) whereby to provide a passage generally annularly disposed about said striking member and of area adequate to permit the rapid flow therethrough of said pressurized fluid from said reservoir into said inflatable cushion in response to a signal generated by said collision sensing means and indicative of a collision,
   (l) filter means interposed between the downstream side of said frangible plate and the inlet of said inflatable cushion.

2. Cushioning apparatus as in claim 1, wherein:
   (m) said cushion is inflated solely by said pressurized fluid in the event of a collision.

3. Cushioning apparatus as in claim 1, wherein:
   (m) said fourth means is electrical wiring.

4. Cushioning apparatus as in claim 3, further comprising:
   (m) a piston mounted on the second end of said striking member,
   and wherein said second means comprises:
   (n) a cylinder secured within said reservoir and having a first end and a second end, said cylinder slidably receiving said piston,
   (o) closure means closing the first end of said cylinder,
   (p) guide means at the second end of said cylinder and having an orifice therethrough slidably receiving said striking member,
   and wherein said third means comprises:
   (q) explosive material positioned in said cylinder between said piston and said closure means,
   (r) electrical ignition means within said cylinder between said piston and said closure means and in contact with said explosive material,
   and wherein:
   (s) said electrical wiring is connected to said electrical ignition means and extends through said closure means in sealed relation therewith.

5. Cushioning apparatus as in claim 4, wherein said explosive material is lead styphnate.

6. Cushioning apparatus as in claim 4, wherein said electrical ignition means is a length of nichrome wire buried in said explosive material.

7. Cushioning apparatus as in claim 4, further comprising:
   (t) a receptacle within said reservoir, and wherein:
   (u) said cylinder is mounted within said receptacle at one end thereof.

8. Cushioning apparatus as in claim 7, wherein said cylinder is mounted at its first end within said receptacle.

9. Cushioning apparatus as in claim 7, wherein said cylinder is mounted at its second end within said receptacle.

10. Cushioning apparatus as in claim 4, further comprising:
    (t) a bridge secured within said reservoir and spanning the major central area of said frangible plate in a plane below the upstream side of said frangible plate,
    (u) a recess in said bridge, (v) the second end of said cylinder being secured within said recess, (w) the bridge being sufficiently below the upstream side of said frangible plate to position the first end of said striking member adjacent but not in contact with said upstream side of the frangible plate.

11. Cushioning apparatus as in claim 9, wherein said recess is located at the midpoint of said bridge so as to permit the first end of said striking member to strike the center of the major central area of said frangible plate.

12. Cushioning apparatus as in claim 4, further comprising:

(t) a bridge secured within said reservoir and spanning the major central area of said frangible plate in a plane below the upstream side of said frangible plate, (u) a recess in said bridge, (v) the first end of said cylinder being secured within said recess, (w) the bridge being sufficiently below the upstream side of said frangible plate to position the first end of said striking member adjacent but not in contact with said upstream side of the frangible plate.

13. Cushioning apparatus as in claim 12, wherein said recess is located at the midpoint of said bridge so as to permit the first end of said striking member to strike the center of the major central area of said frangible plate.

14. Cushioning apparatus as in claim 4, further comprising:

(t) a recess in the interior of said reservoir opposite the upstream side of said frangible plate, (u) the first end of said cylinder being secured within said recess, (v) the distance between said recess and the upstream side of said frangible plate being sufficient to position the first end of said striking member adjacent but not in contact with said upstream side of the frangible plate.

15. Cushioning apparatus as in claim 14, wherein said recess is located at such point in said reservoir as to permit the first end of said striking member to strike the center of the major central area of said frangible plate.

* * * * *